US011053895B2

(12) United States Patent
Heindl et al.

(10) Patent No.: US 11,053,895 B2
(45) Date of Patent: Jul. 6, 2021

(54) MOTOR VEHICLE PIPELINE WITH A MIXING ELEMENT MADE FROM A WIRE STRUCTURE

(71) Applicant: MAN Truck & Bus AG, Munich (DE)

(72) Inventors: Thomas Heindl, Munich (DE); Frank Tuxhorn, Munich (DE)

(73) Assignee: MAN TRUCK & BUS AG, München (DE)

( * ) Notice: Subject to any disclaimer, the term of this patent is extended or adjusted under 35 U.S.C. 154(b) by 113 days.

(21) Appl. No.: 15/908,450

(22) Filed: Feb. 28, 2018

(65) Prior Publication Data

US 2018/0252187 A1    Sep. 6, 2018

(30) Foreign Application Priority Data

Mar. 3, 2017   (DE) .......................... 102017002086.8

(51) Int. Cl.
| | |
|---|---|
| F15D 1/02 | (2006.01) |
| F02M 35/10 | (2006.01) |
| G01F 15/00 | (2006.01) |
| F15D 1/00 | (2006.01) |

(52) U.S. Cl.
CPC ............... *F02M 35/10262* (2013.01); *F02M 35/10295* (2013.01); *F02M 35/10334* (2013.01); *F02M 35/10386* (2013.01); *F15D 1/001* (2013.01); *F15D 1/025* (2013.01); *G01F 15/00* (2013.01); *B60Y 2400/3018* (2013.01); *B60Y 2400/43* (2013.01); *Y02T 10/12* (2013.01)

(58) Field of Classification Search
CPC ....... F02M 35/10262; F02M 35/10334; F02M 35/10386; F15D 1/025
USPC .......................................... 138/39, 41, 42, 44
See application file for complete search history.

(56) References Cited

U.S. PATENT DOCUMENTS 1,490,920 A  *  4/1924  Godward ............... F02M 33/06
                                                              48/189.2
1,829,401 A  *  10/1931  Kamrath ............... F02M 35/024
                                                              140/710
(Continued)

FOREIGN PATENT DOCUMENTS

| CN | 1395082 A | 2/2003 |
|---|---|---|
| DE | 19647081 A1 | 5/1998 |

(Continued)

OTHER PUBLICATIONS

German Office Action issued in corresponding German application No. 102017002086.8 dated Dec. 19, 2017, 10 pages.

(Continued)

*Primary Examiner* — James F Hook
(74) *Attorney, Agent, or Firm* — Weber Rosselli & Cannon LLP

(57) ABSTRACT

The present disclosure relates to a pipeline for supplying a gas to an internal combustion engine, with a pipeline cross section forming a passage for the gas and a gas mass measuring device for measuring a gas mass flow. The pipeline is characterized in particular in that it comprises a mixing element made from a wire structure upstream from the gas mass measuring device and in that the mixing element serves for the thorough mixing of the gas in order to homogenize an inhomogeneous flow profile which is present upstream from the mixing element.

17 Claims, 8 Drawing Sheets

(56) References Cited

U.S. PATENT DOCUMENTS

| | | | | |
|---|---|---|---|---|
| 2,304,689 | A * | 12/1942 | Hanson | A01J 11/16 138/42 |
| 3,112,262 | A * | 11/1963 | Parkinson | B01D 35/147 210/130 |
| 3,346,302 | A * | 10/1967 | Robinson | F16C 33/103 384/368 |
| 3,349,619 | A * | 10/1967 | Millar | G01F 1/40 73/861.52 |
| 3,574,310 | A * | 4/1971 | Souriau | F16J 3/02 137/625.3 |
| 3,733,792 | A * | 5/1973 | Taylor | B01D 39/12 55/488 |
| 3,792,609 | A * | 2/1974 | Blair | G01F 1/40 73/861.52 |
| 3,901,311 | A * | 8/1975 | Kosson | F28D 15/046 165/104.26 |
| 3,960,239 | A * | 6/1976 | Frochaux | B05B 1/005 181/258 |
| 4,457,499 | A * | 7/1984 | Townsend | E02D 13/10 267/137 |
| 4,660,587 | A * | 4/1987 | Rizzie | F15D 1/02 137/8 |
| 4,909,730 | A * | 3/1990 | Roussakis | A62C 4/00 138/42 |
| 5,567,392 | A * | 10/1996 | Becker | B01D 53/9481 422/174 |
| 5,596,969 | A * | 1/1997 | Lipinski | G01F 1/684 123/494 |
| 5,797,380 | A * | 8/1998 | Tada | F02M 35/021 123/572 |
| 5,918,279 | A | 6/1999 | Hecht et al. | |
| 6,893,485 | B2 * | 5/2005 | MacDuff | B01D 19/00 137/176 |
| 7,185,678 | B1 * | 3/2007 | Stell | F01N 1/082 138/41 |
| 8,241,413 | B2 | 8/2012 | Dirnberger | |
| 2004/0055262 | A1 * | 3/2004 | Zettel | B01D 25/24 55/282.3 |
| 2005/0022382 | A1 * | 2/2005 | Bruck | F01N 3/281 29/890 |
| 2005/0170957 | A1 * | 8/2005 | Maus | B01J 35/04 502/439 |
| 2005/0235615 | A1 * | 10/2005 | Nyman | B01D 46/0023 55/350.1 |
| 2005/0268788 | A1 * | 12/2005 | Kaiser | B01D 53/0454 96/417 |
| 2010/0269583 | A1 | 10/2010 | Jasnie | |
| 2015/0300855 | A1 | 10/2015 | Axelsson | |

FOREIGN PATENT DOCUMENTS

| | | |
|---|---|---|
| DE | 10027831 A1 | 12/2001 |
| DE | 10326381 B4 | 9/2005 |
| DE | 202008010058 U1 | 12/2009 |
| DE | 102010062892 A1 | 6/2012 |
| DE | 102011105441 B3 | 7/2012 |
| EP | 0458998 A1 | 12/1991 |
| EP | 0458998 B1 | 1/1996 |
| JP | H08285659 A | 11/1996 |
| JP | 4578406 B2 | 11/2010 |
| JP | 2011064278 A | 3/2011 |
| RU | 2249741 C2 | 4/2005 |
| RU | 2315221 C1 | 1/2008 |
| SU | 664101 A1 | 5/1979 |
| WO | 2014/088487 A1 | 6/2014 |

OTHER PUBLICATIONS

Russian Office Action with Search Report issued in Russian Patent Application No. 2018107648 dated May 14, 2021, 6 pages. No English translation available.

* cited by examiner

MOTOR VEHICLE PIPELINE WITH A MIXING ELEMENT MADE FROM A WIRE STRUCTURE

BACKGROUND

The present disclosure relates to a pipeline for supplying a gas, especially air, to an internal combustion engine, with a pipeline cross section forming a passage for the gas and a gas measuring device (e.g., a gas mass measuring device) for measuring a gas mass flow.

In order to comply with current exhaust gas standards in internal combustion engines, the air mass supplied to the internal combustion engines must be determined as precisely as possible. For this, one uses primarily air mass meters in pipelines working by the heated wire or heated film principle. The flow velocity of the air is usually measured only at certain points in the pipeline cross section. In the more seldom used ultrasound sensors, the measurement is usually done along a line in the pipeline cross section. Since measuring is done only in a very small region of the pipeline cross section, the measurement results are heavily dependent on the flow profile present in the pipeline cross section. But the flow profile is usually nonuniform or inhomogeneous, e.g., due to perturbing factors such as curved pipeline sections, installation tolerances, aging and deformation of components, etc.

While a small number of certain perturbing influences on the flow distribution (such as pipe layout, cross section changes upstream from the air mass meter, design of an air filter, etc.) can be corrected by using a characteristic curve stored in the engine control unit, a large number of certain perturbing influences cannot be corrected, such as perturbing influences caused by installation tolerances, aging and deformation of components, influences due to tapping of air for the pressurized air feed in utility vehicles, use of unapproved air filters, etc.

It is known from WO 2014/088487 A1 how to achieve an improvement in certain perturbing factors by a deliberate changing of the cross section geometry of the pipeline. However, the improvements accomplished in this way are not enough to comply with current exhaust gas standards. Moreover, straightening grids are known from the prior art, such as DE10027831A1, in order to achieve a laminar air flow. Thus, such straightening grids serve primarily to eliminate swirling, so that a turbulent air flow is transformed into a more laminar one, although there is no significant influencing of the flow profile.

SUMMARY

One problem which the present disclosure proposes to solve is to increase the precision of the measurement of a gas mass flow in a pipeline for the supplying of a gas to an internal combustion engine. The present disclosure relates to a substantially rigid or flexible pipeline, for example, for supplying a gas (especially air) to an internal combustion engine, (e.g., of a motor vehicle), especially a utility vehicle (such as a bus or lorry). The pipeline has a pipeline cross section forming a passage for the gas and a gas measuring device (such as a gas mass measuring device) for measuring a gas mass flow (e.g., a gas mass sensor, a measuring device working by the heated wire or heated film principle, or at least one ultrasound sensor, etc.).

The gas measuring device serves to measure the gas mass flow and especially for measuring the flow velocity of the gas mass flow. The present disclosure is characterized in particular in that the pipeline comprises a mixing element made from a wire structure upstream from the gas measuring device and in that the mixing element serves for influencing, or thorough mixing of, the gas in order to homogenize an inhomogeneous (gas) flow profile which is present upstream from the mixing element, i.e., the inhomogeneity can be at least reduced or substantially entirely eliminated. In this way, an inhomogeneous flow profile upstream from the mixing element can expediently be transformed into an at least substantially homogeneous flow profile.

The mixing element can homogenize the inhomogeneous flow profile such that it is transformed into a flow profile which is expediently substantially homogenous e.g. over at least the greater portion of the pipeline cross section. Thus, the mixing element acts in particular so that nonuniform distributions in the flow profile across the pipeline cross section are at least reduced by a thorough mixing (or a substantially complete mixing) of the gas flow, so that after the gas flows through the mixing element the most homogeneous possible flow profile is present (over substantially the entire pipeline cross section).

The achievement of the most homogeneous possible flow profile can be accomplished, in particular, by a deliberate swirling of the gas on wire sections of the wire structure. It is possible for the wire structure to comprise at least one wire mesh or at least one wire weave.

In order to form the mixing element, the wire structure may comprise a rolled-up band of wire mesh or wire weave. Thus, a rolled-up band of wire mesh or wire weave can serve for the forming of the mixing element. The band may comprise, e.g., knitted or woven strips and/or have an e.g. substantially horizontally oriented and/or substantially flat original shape. It is possible for the wire mesh to comprise a wire mesh tube. The wire mesh tube may be pressed flat into a band and the band is rolled up in order to form the mixing element.

It is possible to apply a linear embossing to the band, e.g., one oriented slanting and/or not perpendicular relative to the rolling plane of the band. An embossing oriented e.g. perpendicular to the rolling plane of the band is unfavourable, since the embossing elevations may coincide when the band is rolled up. The embossing may form e.g. a substantially slanting pattern, a V pattern (especially a chevron pattern), or a substantially W pattern, especially in order to enhance the stability, for example in the case of broad bands. The embossing my be formed as an embossed corrugation.

In order to achieve uniform mixing of the gas, the mixing element has a substantially uniform thickness and/or a substantially homogeneous structure. For this, the band may be rolled up in reversed lay, for example, and expediently such that at least two layers of the band arranged on top of one another are expediently rolled up together from one end of the band. The band in the rolled-up state may form individual layers, for example, and it is possible for example for the individual layers to have embossings with different and/or opposite orientation.

When rolling up the band in reversed lay, the band at first is folded back at least once, e.g., on roughly half its length, and then the at least two layers are rolled up together. In this way, embossed elevations of individual rolled-up layers of the band can have a different orientation, especially an opposite one, and thus no longer coincide with each other, so that a mixing element with substantially uniform thickness and/or a substantially homogeneous structure can be formed.

When rolling up the band in parallel lay, the band is rolled up in only one layer from one end of the band, so that embossed elevations of individual rolled-up layers of the band may have the same orientation and thereby coincide with each other. It is possible that, in the rolled-up state of the band, two open ends of the band are arranged on outer sides of the band, for example staggered by 180° +/−40°, +/−30° or +/−20° from each other, so that for example the mixing element has a substantially symmetrical edge region. However, it is also possible that, in the rolled-up state of the band, two open ends of the band are arranged (substantially centrally) inside the band, so that e.g. the mixing element has an asymmetrical edge region.

The mixing element and thus the wire structure may fill up substantially the entire pipeline cross section. It is possible for the mixing element to act as a swirling device, so that swirling of the gas at wire sections of the wire structure ensures the thorough mixing of the gas and the homogenization of the inhomogeneous flow profile.

A gas flow at the outlet of the mixing element may thus have, e.g., a plurality of small swirls. Alternatively or additionally, a gas flow at the outlet of the mixing element can be more heavily swirled than at the inlet of the mixing element. Despite or in fact because of the swirling, a homogeneous flow profile is made possible.

It is possible to form a substantially linear (e.g., straight) calming section for the gas and/or at least one straightening device (such as a straightening grid) for reducing the swirls and thus for achieving a substantially laminar gas flow downstream from the mixing element in order to dampen (and especially reduce) the swirls. A straightening device for reducing of swirls can be arranged, for example, in or directly in front of a gas inlet (such as a gas inlet of a measuring tube) of the gas measuring device.

It is possible to arrange wire sections of the wire mesh in random orientation and/or intersecting behind one another expediently at any given angle, so that the gas is deflected several times during its flow through the mixing element. The deflection may occur in all three spatial directions.

It is possible to arrange wire sections of at least two wire weave layers intersecting behind one another expediently at any given angle, so that the gas is deflected several times during its flow through the mixing element. The deflection may occur in all three spatial directions.

The pipeline may have upstream from the mixing element at least one perturbing element and the perturbing element results in the gas having an inhomogeneous/nonuniform flow profile across the pipeline cross section upstream from the mixing element. Alternatively or additionally, the pipeline may be curved upstream from the mixing element and the curvature has the result that the gas has an inhomogeneous/nonuniform flow profile across the pipeline cross section upstream from the mixing element. The mixing element, the calming section and/or at least one straightening device is arranged in the pipeline upstream from the gas measuring device. Upstream from the mixing element there can be arranged, e.g., a gas filter for the filtering of the gas.

The wire structure may be formed from a metal material, especially refined steel. But in the context of the present disclosure, the wire structure may also be formed, e.g., from a plastic material. The wire mesh may be knitted from a single wire, especially a metal and/or plastic thread, at least in sections. As already mentioned, the gas is air. Thus, the gas measuring device is an air measuring device. The gas measuring device serves for measuring the (gas) flow velocity.

In the context of the present disclosure, the feature "homogenize" or "homogeneous" connotes embodiments in which an inhomogeneity is substantially entirely eliminated, but also embodiments in which an inhomogeneity is only expediently substantially reduced. The feature "homogeneous" and/or "homogenize" is therefore not limited to a complete homogenization of an inhomogeneous flow profile. For example, a flow profile which is substantially rotationally symmetrical about the centre axis of the pipe may also expediently be subsumed under the feature "homogeneous" and/or "homogenize" in the context of the present disclosure.

The present disclosure also relates to a motor vehicle, e.g., a utility vehicle (such as a bus or lorry) with a pipeline is claimed in one of the preceding claims.

The above described embodiments and features of the present disclosure may be combined with each other. Other advantageous modifications of the present disclosure are disclosed in the dependent claims or emerge from the following description of embodiments of the present disclosure in conjunction with the accompanying figures.

BRIEF DESCRIPTION OF THE FIGURES

The embodiments shown in the figures match up with each other in part, so that identical or similar parts are given the same reference number, and one should also refer for their explanation to the description of the other embodiments, in order to avoid repetition.

DETAILED DESCRIPTION

Figure 1:
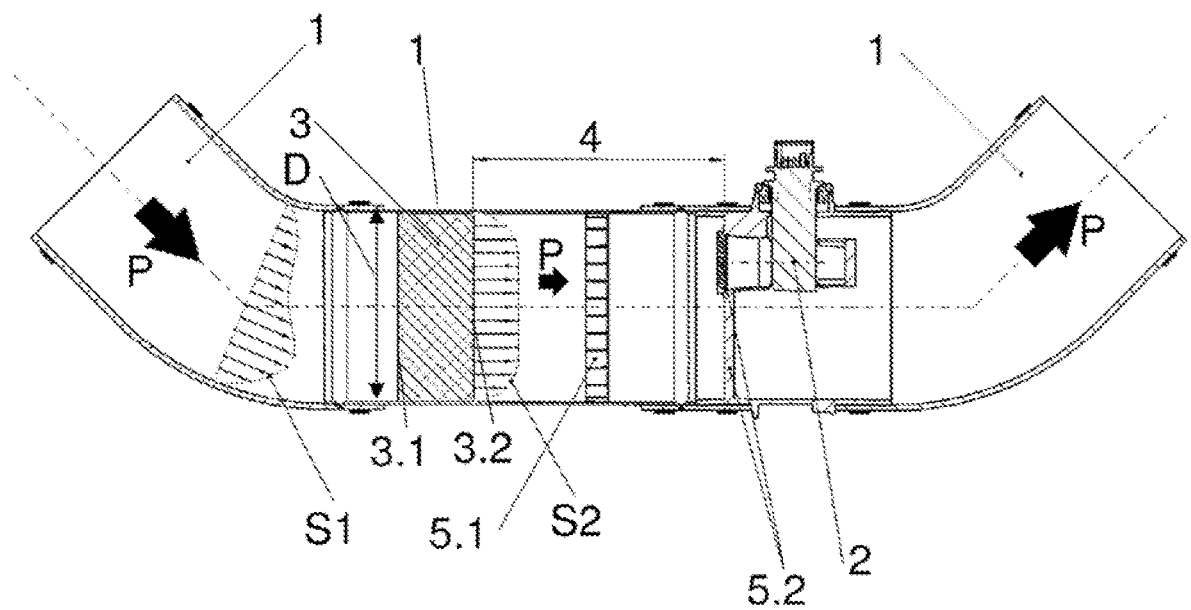
FIG. 1 shows a view of a pipeline according to one embodiment of the present disclosure.

FIG. 1 shows a view of a pipeline 1 for supplying a gas in the form of air to an internal combustion engine (not shown) according to one embodiment of the present disclosure. The arrows P designate the flow direction of the gas through the pipeline 1. The left part of the pipeline 1 in FIG. 1 forms a clean air pipe from a gas filter (not shown), and the right part side of the pipeline 1 in FIG. 1 forms a clean air pipe to the internal combustion engine.

The pipeline 1 comprises a pipeline cross section D forming a passage for the gas and a gas measuring device 2 for measuring a gas mass flow. The gas measuring device 2 works preferably on the heated film or heated wire principle, or also with at least one ultrasound sensor. Other measurement devices known in the prior art may also be used. The gas measuring device 2 expediently measures the flow velocity only at certain points, so that the most homogeneous possible flow profile across the pipeline cross section D is advantageous for an accurate measurement.

Reference symbol S1 designates a flow profile upstream from a mixing element 3, described more closely below. FIG. 1 shows that the flow profile S1 is inhomogeneous and thus nonuniform, especially due to the curvature of the left part of the pipeline 1 shown in FIG. 1. Other perturbing elements may also result in an inhomogeneous flow profile S1, such as installation tolerances, aging and deformation of components, influences due to tapping of air for the pressurized air supply in utility vehicles, the use of unapproved air filters, etc. A measurement of the mass or the flow velocity in an inhomogeneous flow profile S1 would lead to an inaccurate result.

Therefore, a mixing element 3 with an inlet 3.1 and an outlet 3.2 for the gas is installed in the pipeline 1 upstream from the gas measuring device 2. The mixing element 3 is formed from a metallic or plastic wire structure and it serves for the thorough mixing of the gas, in order to homogenize the inhomogeneous flow profile S1 which is present upstream from the mixing element 3, so that its inhomogeneity is at least reduced, or preferably substantially eliminated. The mixing element 3 works in such a way that the inhomogeneous flow profile S1 is transformed into a substantially homogeneous flow profile S2 across the pipeline cross section D.

The mixing element 3 fills up the entire pipeline cross section D and functions in particular as a swirling device, so that the mixing of the gas and thus the homogenization occurs by swirling of the gas at wire sections of the wire structure. The gas flow at the outlet 3.2 of the mixing element 3 thus has a multitude of relatively small eddies. Embodiments are even possible in which the gas flow at the outlet 3.2 of the mixing element 3 is more intensively swirled than at the inlet 3.1 of the mixing element 3.

For the dampening of the eddies downstream from the mixing element 3, the pipeline 1 comprises a substantially linear calming section 4, inside which the eddies can die down. Furthermore, the pipeline 1 comprises two optional straightening grids 5.1 and 5.2, which likewise serve for reducing the eddies downstream from the mixing element 3. The straightening grid 5.2 is expediently situated in or immediately in front of a gas inlet of the gas measuring device 2, preferably in or immediately in front of its measuring tube.

Thus, the purpose of the mixing element 3 is to eliminate unequal distributions in the flow profile across the pipeline cross section D by a mixing (e.g., by a substantially complete mixing) of the gas flow, so that after flowing through the mixing element 3 the most homogeneous possible flow profile S2 is present across the preferably substantially entire pipeline cross section D. This can be accomplished, in particular, by a deliberately initiated swirling of the gas on wire sections of the wire structure.

Consequently, the mixing element 3 serves in particular for the homogenization of an inhomogeneous flow profile and—unlike the customary eddy suppression devices of the prior art—preferably not for the transformation of a turbulent gas flow into a more laminar gas flow.

In order to make possible the most uniform possible mixing of the gas and thus the most homogeneous possible flow profile S2, the mixing element 3 is configured with a substantially uniform thickness and a substantially homogeneous structure.

The mixing element 3 is arranged in the pipeline 1 upstream from the calming section 4 and the two optional straightening grids 5.1 and 5.2. The mixing element 3, the calming section 4 and the two optional straightening grids 5.1 and 5.2 are arranged upstream from the gas measuring device 2 in the pipeline 1.

Figure 2:
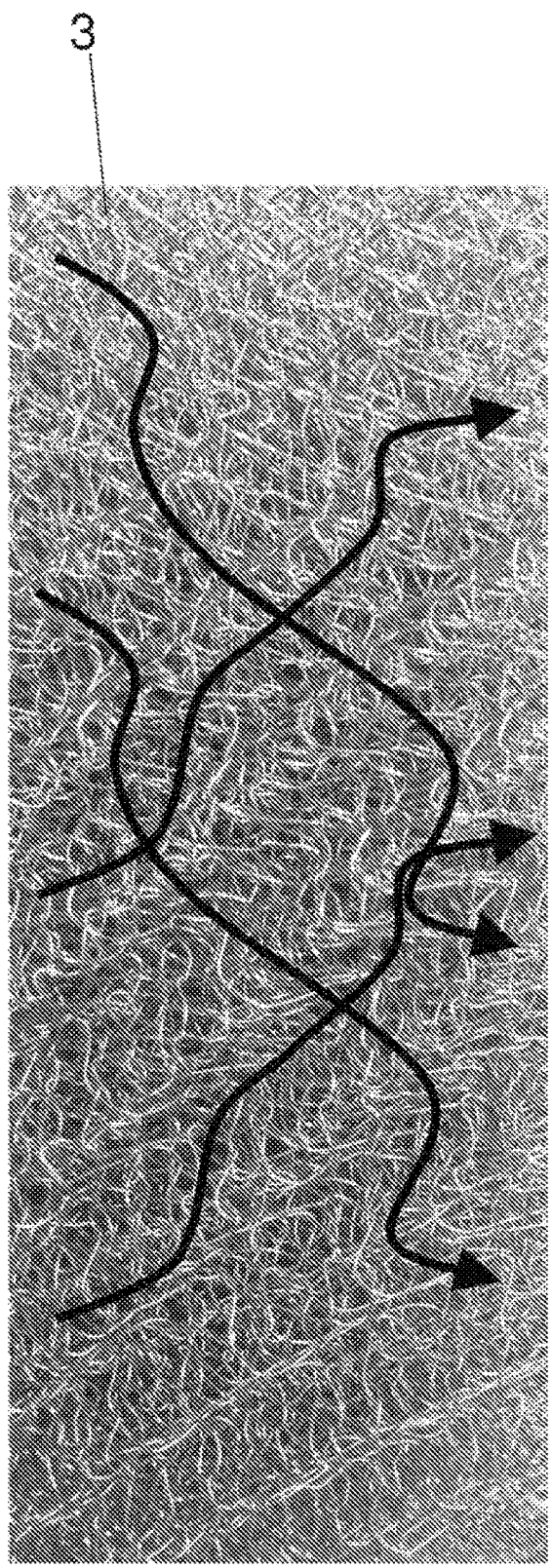
FIG. 2 shows a segment of a mixing element made of wire mesh according to one embodiment of the present disclosure.

FIG. 2 shows a segment of a mixing element 3 made from wire mesh according to one embodiment of the present disclosure.

It becomes clear from FIG. 2 that wire sections of the wire mesh are arranged in random fashion and intersecting behind one another, so that the gas during its flow through the mixing element 3 is deflected repeatedly, preferably in all three spatial directions, and thus can be effectively swirled and/or blended, which is indicated schematically in FIG. 2 by the arrows inside the mixing element 3.

Figure 3:
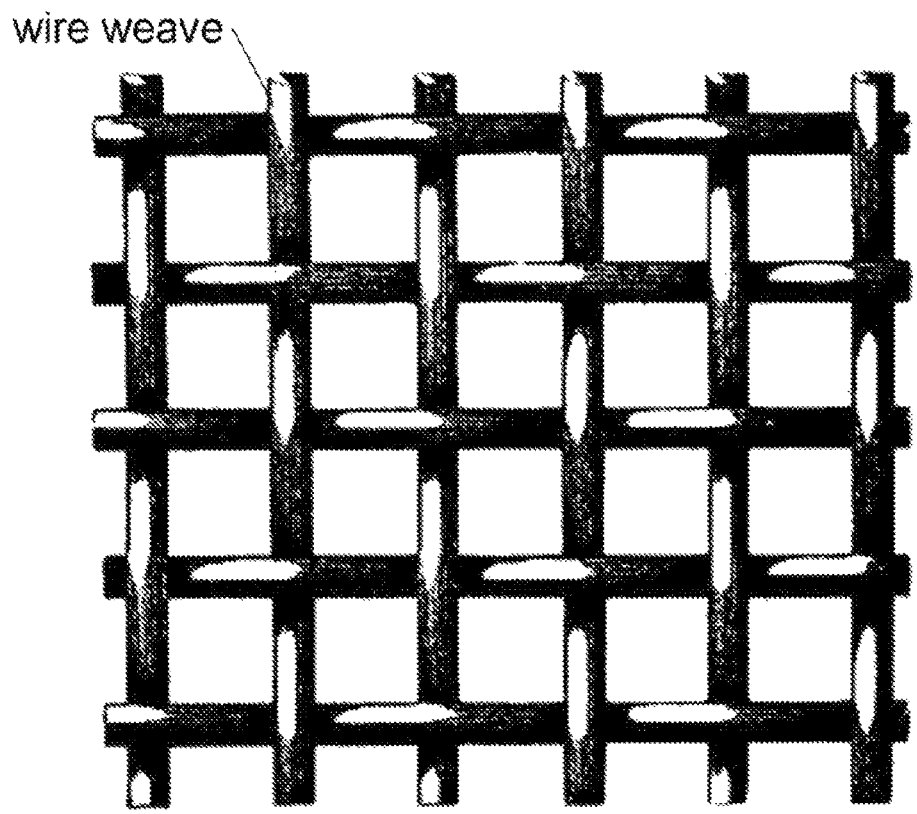
FIG. 3 shows a segment of a wire weave to form a mixing element according to one embodiment of the present disclosure.

FIG. 3 shows a segment of a wire weave to form a mixing element 3 according to one embodiment of the present disclosure.

At least two such wire weaves may be arranged behind one another, for example, so that their wire sections cross each other, and in this way the gas during its flow through the mixing element 3 can be deflected repeatedly and thus effectively swirled and/or blended and homogenized.

Figure 4:
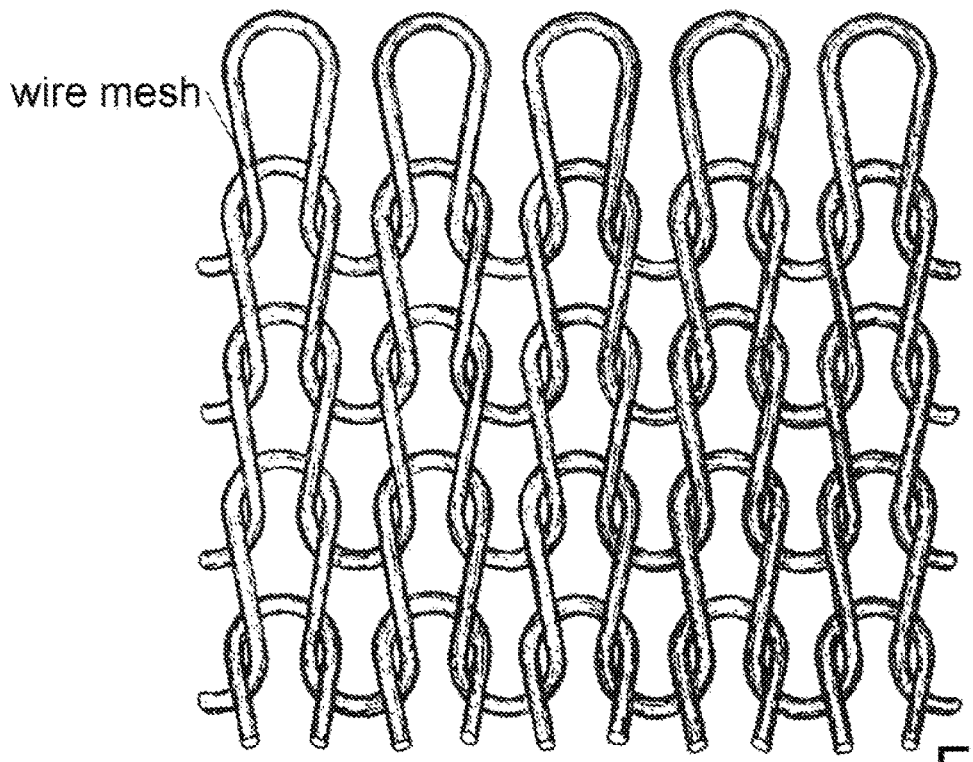
FIG. 4 shows a segment of a wire mesh to form a mixing element according to one embodiment of the present disclosure.

FIG. 4 shows a segment of a wire mesh to form a mixing element 3 according to one embodiment of the present disclosure. The wire mesh is knitted at least for a portion from a single (metal or plastic) thread.

Figure 5:
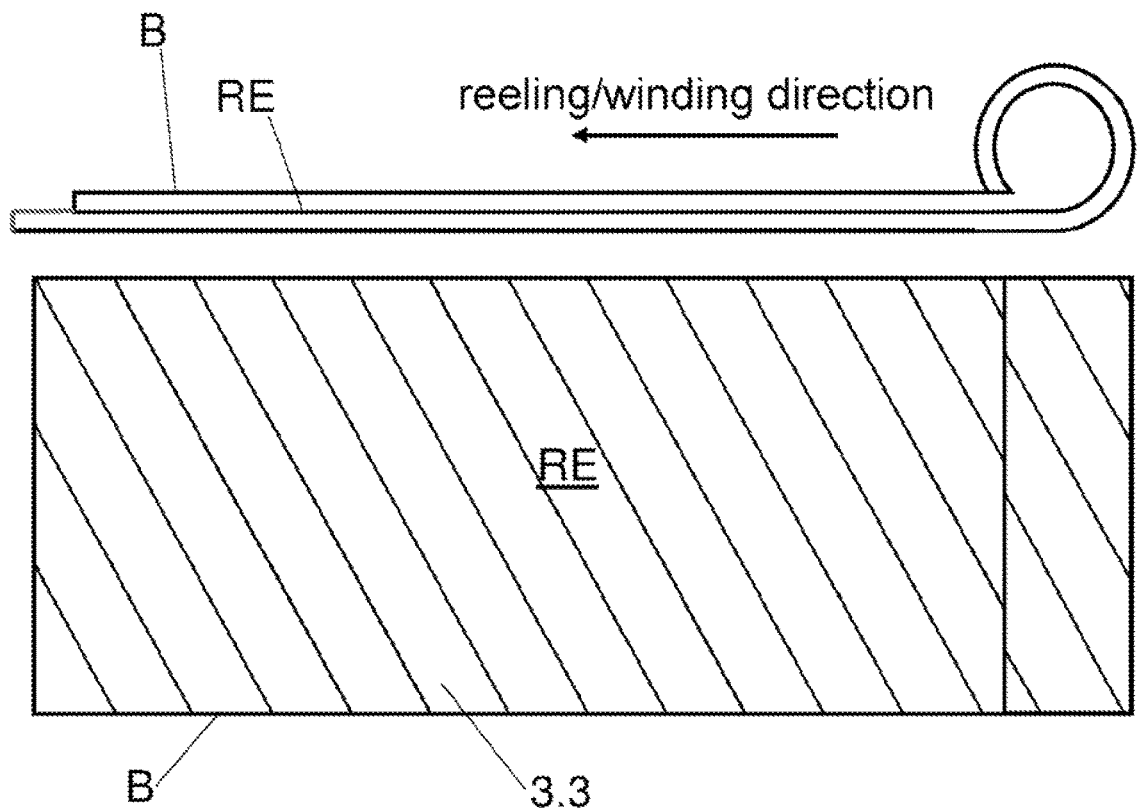
FIG. 5 shows views of a band to form a mixing element according to one embodiment of the present disclosure.

FIG. 5 shows views of a band B for forming a mixing element 3 according to one embodiment of the present disclosure, FIG. 5 representing at the top a side view and at the bottom a corresponding top view of the band B. The band B may expediently be formed from a wire weave, as shown in FIG. 3 for example, or from a wire mesh, as shown in FIG. 4 for example.

The mixing element 3 can be produced in particular by rolling (winding) up the band B. There is applied to the band B an embossing 3.3, which is oriented slanting and/or not perpendicular to the rolling plane RE of the band B. The embossing 3.3 should not be oriented perpendicular to the rolling plane RE, or else embossed elevations might disadvantageously line up with each other when rolling up the band B.

FIG. 5 illustrates a rolling up of the band B in reversed lay, so that at least two layers of the band B placed on one another are rolled up together. When forming the mixing element 3 in reversed lay, the band B is preferably reverse laid in particular on roughly half of its length, and then the resulting layers are rolled up together.

In the rolled-up state, the band B and thus the mixing element 3 has individual layers, and the individual layers may have embossings 3.3 with different, especially opposite orientation. In this way, embossed elevations can no longer line up with each other, which contributes to a substantially uniform thickness and a substantially homogeneous structure of the mixing element 3.

For increased stability especially in the case of relatively broad bands B, the embossing 3.3 may also have other patterns, for example, it may be substantially V-shaped (especially chevron-shaped) or W-shaped.

In the case of a winding up in parallel, on the other hand, the band B is rolled up in a single layer from one end. Embossings 3.3 of individual layers then have the same orientation. Thus, embossed elevations may line up with each other in disadvantageous manner.

A mixing element 3 made from wire mesh may be formed in particular as follows: the wire mesh is provided in the form of a wire mesh tube. The wire mesh tube is at first pressed flat into a band B and embossed, after which the band B can be rolled up to form the mixing element 3, e.g., by the principle shown in FIG. 5.

Figure 6:
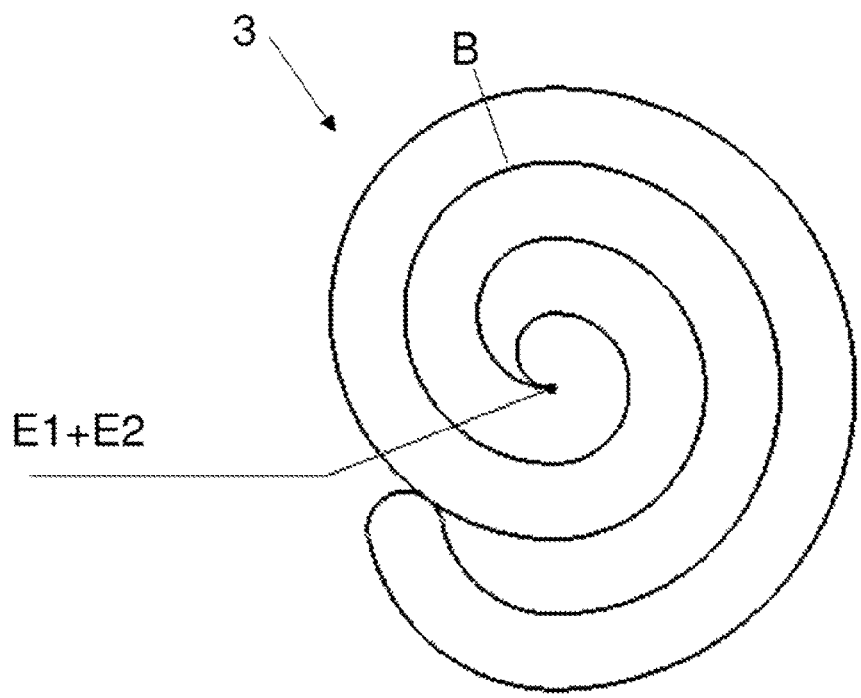
FIG. 6 shows a view of a rolled-up band to form a mixing element according to one embodiment of the present disclosure.

FIG. 6 shows a view of a rolled-up band B to form a mixing element 3 according to one embodiment of the present disclosure.

In the embodiment shown in FIG. 6, two open ends E1 and E2 of the band B are arranged substantially centrally inside the rolled-up band B, so that the mixing element 3 has an asymmetrical edge region. Although the mixing element 3 ensures a substantially homogeneous flow profile across a major portion of the pipeline cross section D, an inhomogeneous flow profile may be present in the edge region of the mixing element 3 and thus in the edge region of the pipeline cross section D.

Figure 7:
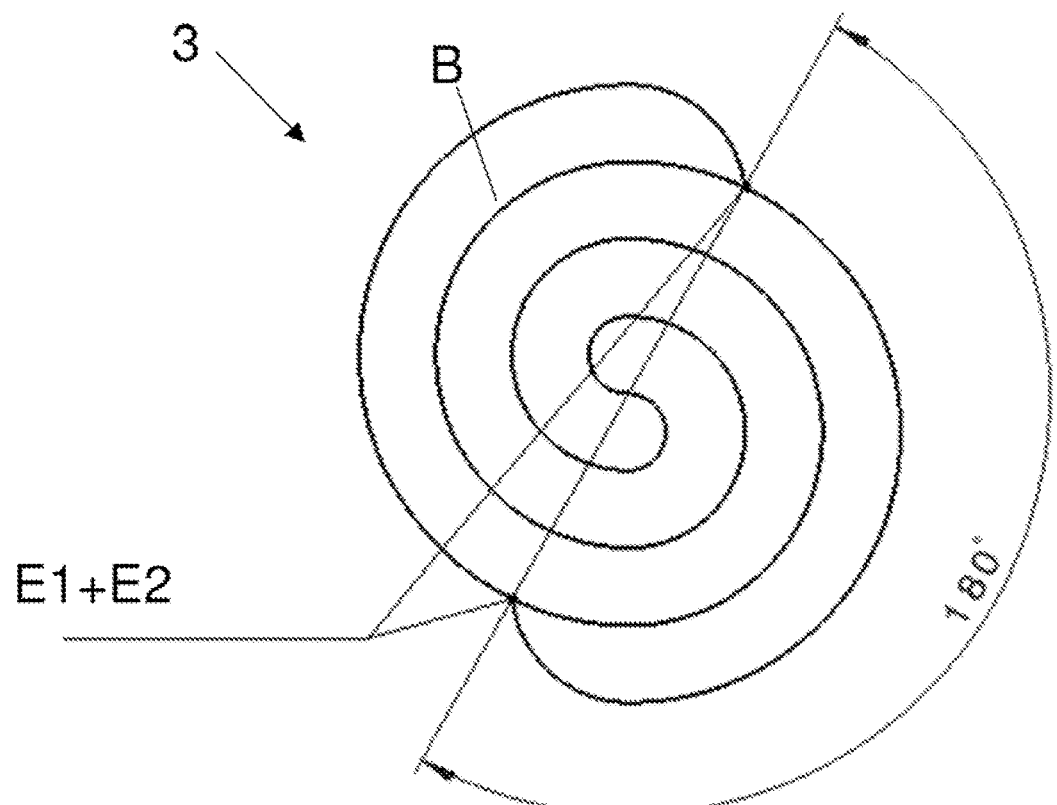
FIG. 7 shows a view of a rolled-up band to form a mixing element according to another embodiment of the present disclosure.

FIG. 7 shows a view of a rolled-up band B to form a mixing element 3 according to one embodiment of the present disclosure.

In the embodiment shown in FIG. 7, two open ends E1 and E2 of the band B are arranged on outer sides of the rolled-up band B and staggered by substantially 180° from each other, so that the mixing element 3 has a symmetrical edge region, which contributes to enhanced homogeneity of the flow profile across the pipeline cross section D.

Figure 8:
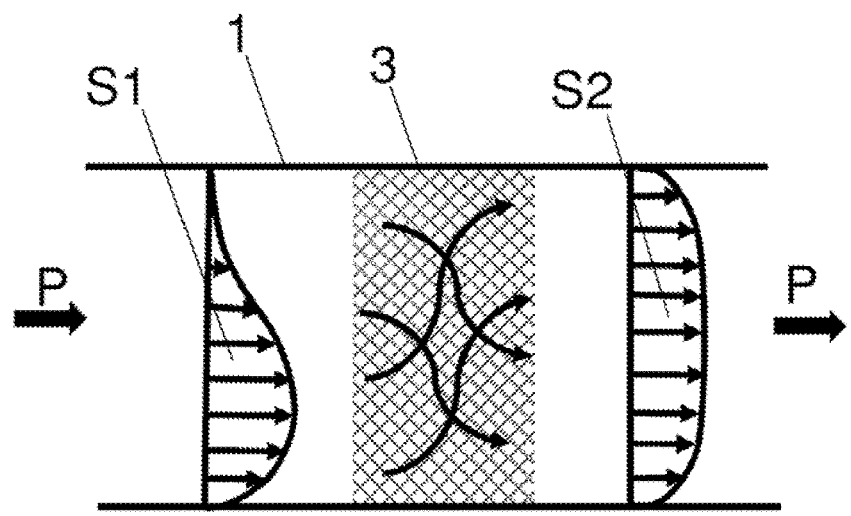
FIG. 8 shows schematically the mode of operation of a mixing element according to one embodiment of the present disclosure.

FIG. 8 illustrates schematically the working principle of a mixing element 3 according to one embodiment of the present disclosure.

FIG. 8 shows that the mixing element 3 serves for thorough mixing of the gas, so that an inhomogeneous flow profile S1 upstream from the mixing element 3 is transformed into an at least for the most part homogeneous flow profile S2. For this purpose, the mixing element 3 is preferably designed as a swirling device, so that the blending of the gas and the homogenization is done by means of a swirling of the gas at wire sections of the wire structure. In particular, the gas is deflected inside the mixing element 3 in all three spatial directions, which contributes to an effective homogenization of the flow profile.

Figure 9:
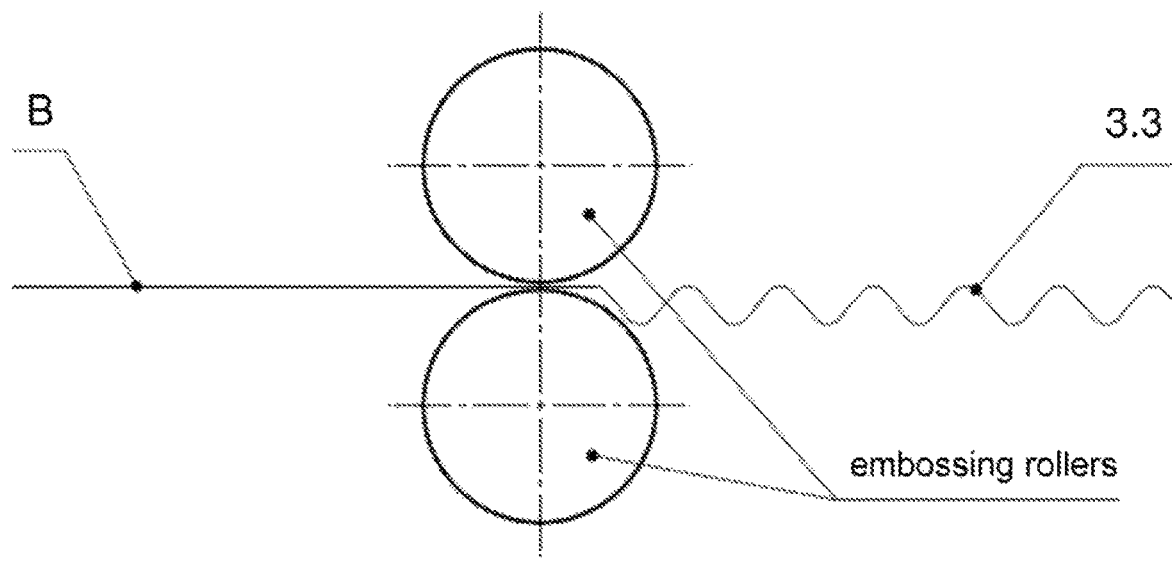
FIG. 9 illustrates a method of producing an embossing for a mixing element according to one embodiment of the present disclosure.

FIG. 9 illustrates a method for producing an embossing 3.3 on a band B for a mixing element 3 according to one embodiment of the present disclosure. The band B is conveyed through two embossing rollers in order to produce the embossing 3.3.

The wire structure, i.e., in particular the knitting, is usually created as a tube in a circular knitting process. The tube upon emerging from the knitting machine is pressed flat into a band B. If, alternatively, a flat knitting process is employed, this step is eliminated and the knitting is present immediately as a flat band B. This band B now runs through two embossing rollers, on the surfaces of which there is applied an embossing structure, e.g., an oblique, V-shaped or W-shaped wave structure. In this way, the band B is embossed, for example, with an oblique, V-shaped, or W-shaped embossing 3.3 (corrugation). The depth of the embossing 3.3 can be adjusted by the spacing of the embossing rollers from each other.

Figure 10:
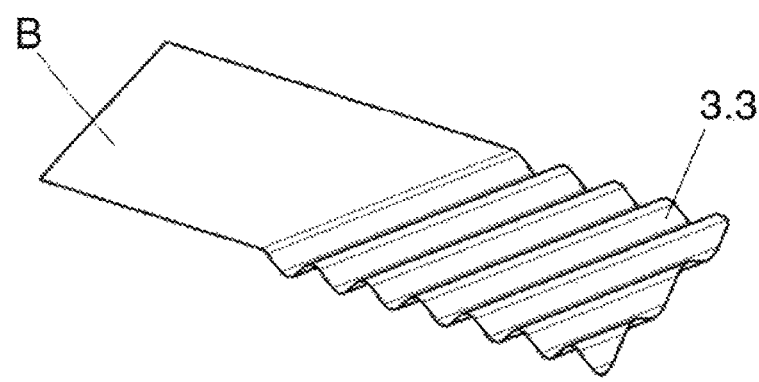
FIG. 10 shows different views of an oblique embossing for a mixing element according to one embodiment of the present disclosure.
Figure 10:
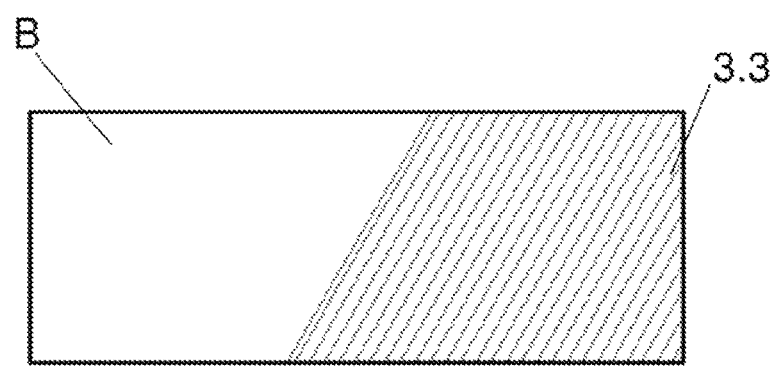

FIG. 10 shows at the top a perspective view and at the bottom a top view of a band B for a mixing element 3, where the band B has an oblique embossing 3.3.

Figure 11:
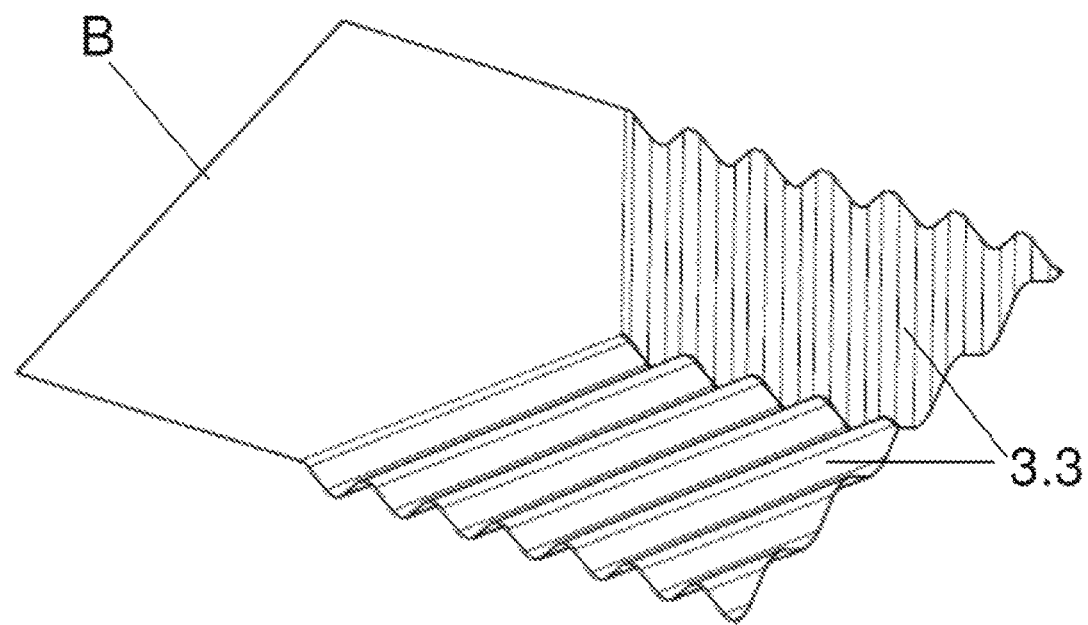
FIG. 11 shows different views of a V-embossing for a mixing element according to one embodiment of the present disclosure.
Figure 11:
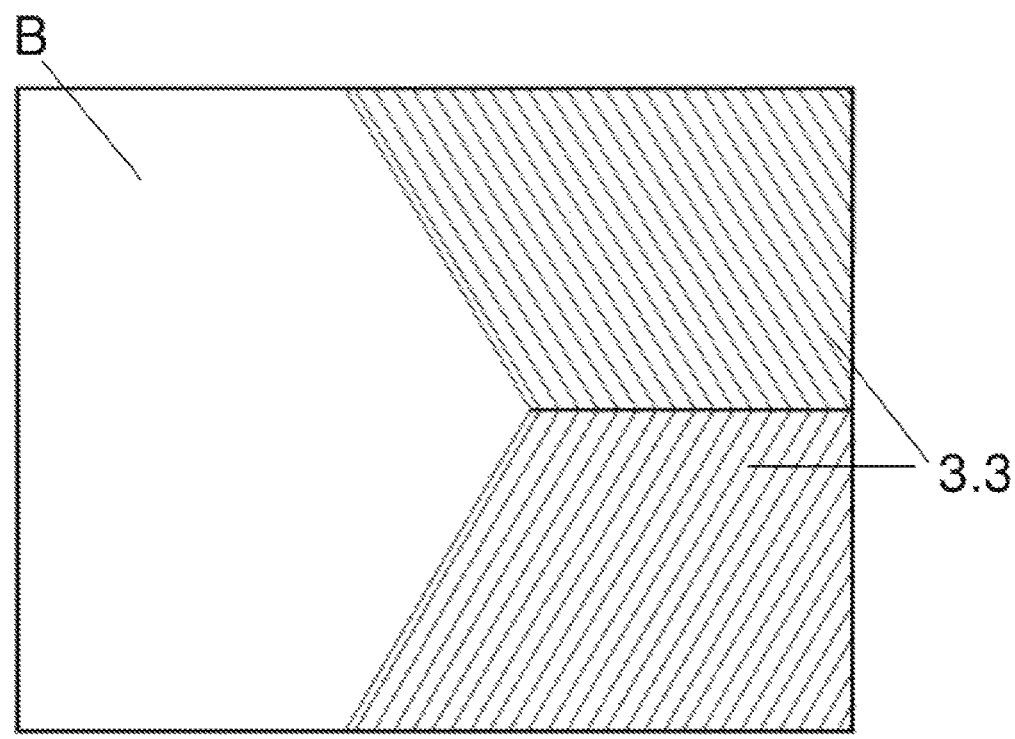

FIG. 11 shows at the top a perspective view and at the bottom a top view of a band B for a mixing element 3, where the band B has a V-embossing 3.3.

Figure 12:
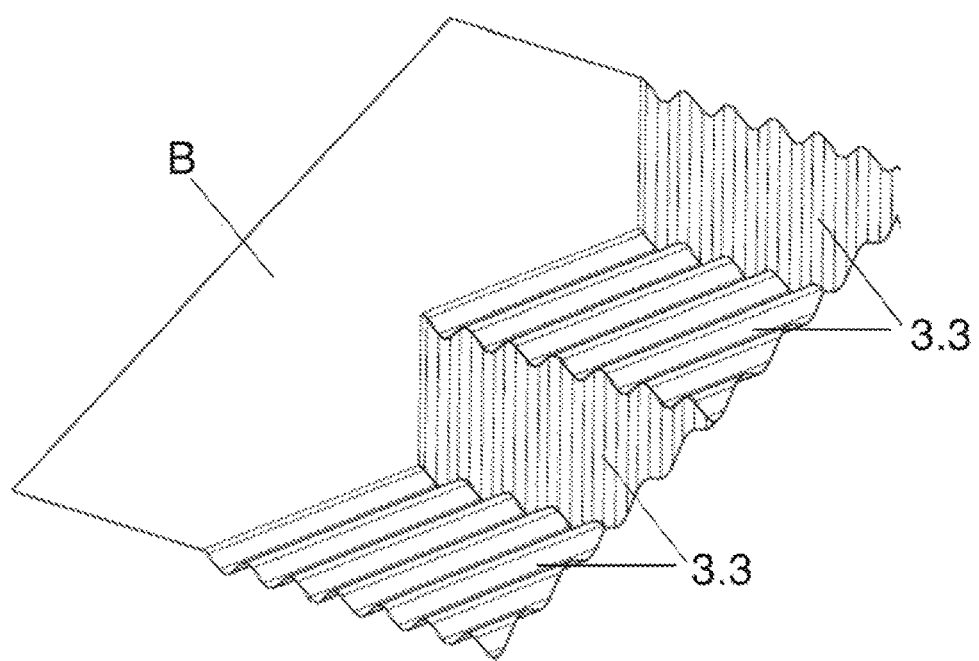
FIG. 12 shows different views of a W-embossing for a mixing element according to one embodiment of the present disclosure.
Figure 12:
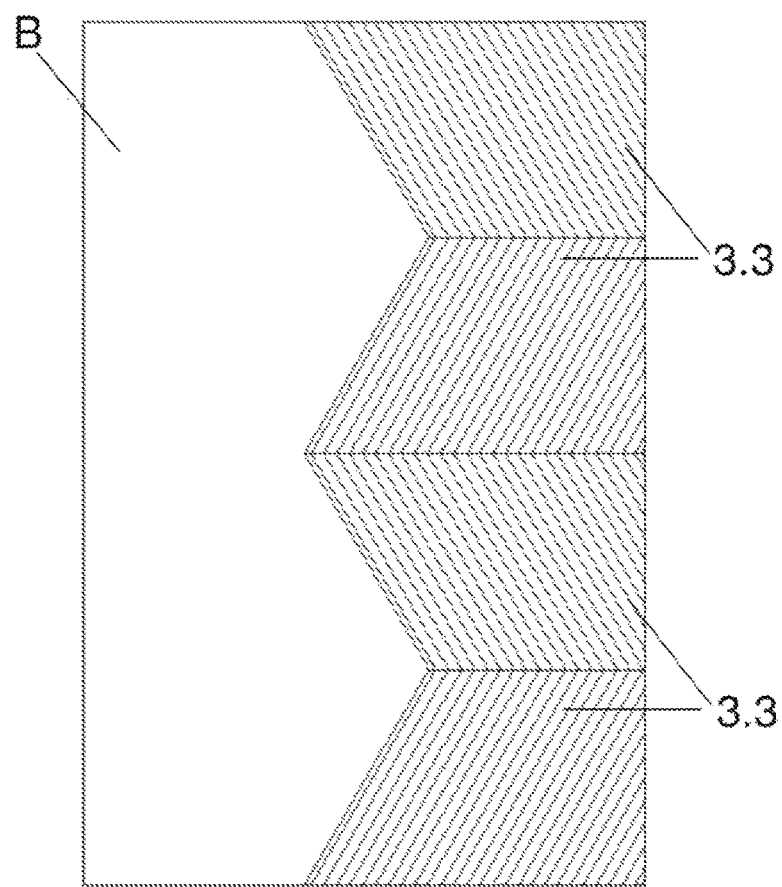

FIG. 12 shows at the top a perspective view and at the bottom a top view of a band B for a mixing element 3, where the band B has a W-embossing 3.3. A W-embossing 3.3 thus has preferably at least two V-embossings.

Utilization of the present disclosure results in an almost ideal homogeneous flow distribution upstream from the gas measuring device can be achieved. Eddies produced by the homogenization can be largely eliminated by the arrangement up to the gas measuring device. This makes possible a highly accurate determination of the gas mass, substantially with no perturbing influences.

The pressure loss caused by the mixing element is relatively slight as compared to the pressure loss of the overall intake system. The simple integration of the mixing element in the pipeline, already existing designs of intake systems can be easily amplified with the addition of a gas mass measuring device.

The properties of the mixing element are determined primarily by the geometrical dimensions, wire thickness, wire density, type of winding, mesh count of the knitting or grid pattern of the weaving, type of embossing and depth of embossing, as well as length of the mixing element. By using one or more of these parameters, pressure loss and degree of mixing can be adapted for the gas mass flow.

The present disclosure is not limited to the above-described preferred exemplary embodiments. Instead, a number of variants and modifications are possible, likewise making use of the idea of the present disclosure and therefore falling within its realm of protection. In particular, the present disclosure also claims protection for the subject matter and the features of the dependent claims, regardless of the particular claims referred to and in particular also without the features of the main claim. Thus, the present disclosure encompasses various aspects of present disclosure which enjoy protection independently of one another.

LIST OF REFERENCE NUMBERS

1 Pipeline
2 Gas measuring device, especially air measuring device
3 Mixing element
3.1 Inlet
3.2 Outlet
3.3 Embossing
D Pipeline cross section
B Band to form the mixing element
E1 Open end of band
E2 Open end of band
RE Rolling plane
4 Calming section
5.1 Straightening device to reduce swirling
5.2 Straightening device to reduce swirling
S1 Inhomogeneous gas mass distribution
S2 Homogeneous gas mass distribution
P Flow direction of the gas

We claim:

1. A pipeline for supplying a gas to an internal combustion engine, with a pipeline cross section forming a passage for the gas and a gas measuring device for measuring a gas mass flow, comprising:
a mixing element made from a wire structure and located upstream from the gas measuring device, wherein the mixing element serves for influencing and thorough mixing of the gas in order to homogenize an inhomogeneous flow profile which is present upstream from the mixing element, wherein the wire structure comprises a rolled-up band of wire mesh or a rolled-up band of wire weave to form the mixing element or a wire mesh tube is pressed flat into a band and the band is rolled up to form the mixing element further comprising an embossing applied to the band, wherein the embossing is oriented slanting or not perpendicular relative to a rolling plane of the band.

2. The pipeline according to claim 1, wherein characterized in that the mixing element homogenizes the inhomogeneous flow profile such that it is transformed into a flow profile which is substantially homogeneous over the pipeline cross section.

3. The pipeline according to claim 1, wherein the embossing is formed as an embossed corrugation or forms a slanting, a V, or a W pattern.

4. The pipeline according to claim 1, wherein the mixing element has a uniform thickness or a homogeneous structure.

5. The pipeline according to claim 1, wherein the band is rolled up in reversed lay, such that at least two layers of the band arranged one on top of the other are rolled up together.

6. The pipeline according to claim 1, wherein the band in the rolled-up state forms individual layers and the individual layers have embossings which are oriented differently or oppositely.

7. The pipeline according to claim 1, wherein in the rolled-up state of the band,
two open ends of the band are arranged on outer sides of the band and staggered by 180° +/−40°, +/−30° or +/−20° from each other, or
two open ends of the band are arranged centrally inside the band.

8. The pipeline according to claim 1, wherein the mixing element fills up the entire pipeline cross section.

9. The pipeline according to claim 1, wherein the mixing element acts as a swirling device, so that swirling of the gas at wire sections of the wire structure ensures the thorough mixing of the gas and the homogenization of the inhomogeneous flow profile.

10. The pipeline according to claim 1, wherein a gas flow at an outlet of the mixing elements has a plurality of swirls or a gas flow at the outlet of the mixing element is more heavily swirled than at an inlet of the mixing element and in that a linear calming section or at least one straightening device for reducing the swirls is formed downstream from the mixing element in order to dampen the swirls created by the mixing element.

11. The pipeline according to claim 1, wherein a straightening device for reducing of swirls is arranged in or directly in front of a gas inlet of the gas measuring device.

12. The pipeline according to claim 1, wherein,
wire sections of a wire mesh are arranged in random orientation or intersecting behind one another, so that the gas is deflected several times during its flow through the mixing element, or
wire sections of at least two wire weave layers are arranged intersecting behind one another, so that the gas is deflected several times during its flow through the mixing element.

13. The pipeline according to claim 1, wherein upstream from the mixing element
includes a perturbing element and the perturbing element results in the gas having an inhomogeneous flow profile across the pipeline cross section upstream from the mixing element or
the pipeline is curved so that the gas has an inhomogeneous flow profile across the pipeline cross section upstream from the mixing element.

14. The pipeline according to claim 1, wherein the mixing element, a calming section or at least one straightening device is arranged in the pipeline upstream from the gas measuring device.

15. The pipeline according to claim 1, wherein the wire structure is formed from a metal or plastic material, or the wire mesh is knitted from a single wire at least in sections.

16. The pipeline according to claim 1, wherein the mixing element is located upstream from an intake of the gas measuring device.

17. A motor vehicle, preferably a utility vehicle, comprising
a pipeline for supplying a gas to an internal combustion engine, with a pipeline cross section forming a passage for the gas;
a gas measuring device for measuring a gas mass flow; and
a mixing element made from a wire structure and located upstream from the gas measuring device, wherein the mixing element serves for influencing and thorough mixing of the gas in order to homogenize an inhomogeneous flow profile which is present upstream from the mixing element, wherein the wire structure comprises a rolled-up band of wire mesh or a rolled-up band of wire weave to form the mixing element or a wire mesh tube is pressed flat into a band and the band is rolled up to form the mixing element.

* * * * *